(12) United States Patent
Byun

(10) Patent No.: US 11,500,771 B2
(45) Date of Patent: Nov. 15, 2022

(54) MEMORY SYSTEM, MEMORY CONTROLLER, AND METHOD OF OPERATING MEMORY SYSTEM

(71) Applicant: SK hynix Inc., Icheon (KR)

(72) Inventor: Eu Joon Byun, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/154,838

(22) Filed: Jan. 21, 2021

(65) Prior Publication Data

US 2022/0058122 A1 Feb. 24, 2022

(30) Foreign Application Priority Data

Aug. 24, 2020 (KR) .................. 10-2020-0106069

(51) Int. Cl.
*G06F 11/14* (2006.01)
*G06F 12/0804* (2016.01)

(52) U.S. Cl.
CPC ...... *G06F 12/0804* (2013.01); *G06F 11/1451* (2013.01); *G06F 2201/82* (2013.01); *G06F 2212/1032* (2013.01)

(58) Field of Classification Search
CPC ...... G06F 11/14; G06F 11/1451; G06F 12/08; G06F 12/0804
See application file for complete search history.

(56) References Cited

U.S. PATENT DOCUMENTS

| | | | | |
|---|---|---|---|---|
| 9,201,783 | B2* | 12/2015 | Song | G06F 12/0246 |
| 10,866,889 | B2* | 12/2020 | Lee | G06F 3/064 |
| 2013/0173850 | A1* | 7/2013 | Song | G06F 11/1441 |
| | | | | 711/103 |
| 2015/0193464 | A1* | 7/2015 | Kwon | G06F 16/1815 |
| | | | | 707/648 |
| 2018/0267903 | A1* | 9/2018 | No | G06F 3/0623 |
| 2018/0314643 | A1* | 11/2018 | Park | G06F 12/1009 |
| 2018/0336104 | A1* | 11/2018 | Koo | G06F 11/1458 |
| 2019/0138447 | A1* | 5/2019 | Koo | G06F 12/0804 |
| 2019/0146705 | A1* | 5/2019 | Lin | G06F 3/0647 |
| | | | | 711/103 |
| 2019/0236005 | A1* | 8/2019 | Lee | G06F 11/1068 |
| 2020/0167235 | A1* | 5/2020 | Chai | G06F 3/0679 |
| 2021/0165734 | A1* | 6/2021 | Chung | G06F 12/0891 |
| 2021/0165735 | A1* | 6/2021 | Chung | G06F 12/0873 |

FOREIGN PATENT DOCUMENTS

| | | |
|---|---|---|
| KR | 20130066277 A | 6/2013 |
| KR | 20180126118 A | 11/2018 |

* cited by examiner

*Primary Examiner* — Kamini B Patel

(57) ABSTRACT

Disclosed are a memory system, a memory controller, and a method of operating the memory system. The memory system performs an operation of recovering system data lost due to SPO when an SPO recovery operation is performed, and flushes recovered system data into the memory device after a first time point at which the operation of recovering the system data is completed and before a second time point at which a power off preparation request is received from a host.

19 Claims, 12 Drawing Sheets

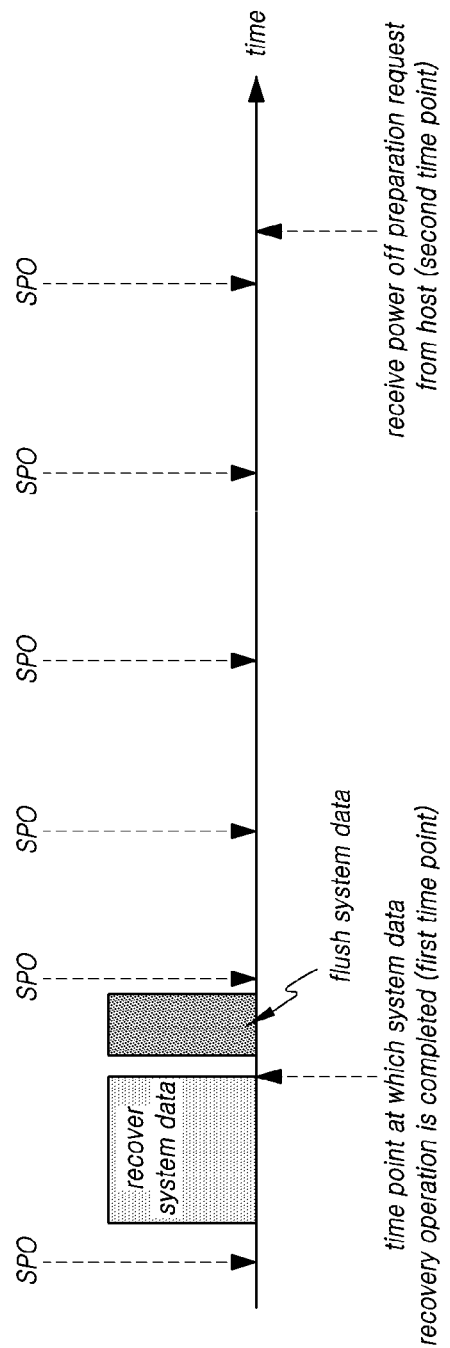

MEMORY SYSTEM, MEMORY CONTROLLER, AND METHOD OF OPERATING MEMORY SYSTEM

CROSS REFERENCE TO RELATED APPLICATION

The present application claims priority under 35 U.S.C. 119(a) to Korean patent application number 10-2020-0106069 filed on Aug. 24, 2020, which is incorporated herein by reference in its entirety.

BACKGROUND OF THE INVENTION

1. Field of the invention

Embodiments of the present disclosure relate to a memory system, a memory controller, and a method of operating the memory system.

2. Description of the Prior Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory, such as a solid state drive (SSD), a universal flash storage device (UFS), or an embedded MMC (eMMC) device.

The memory system may include a memory device and a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

When Sudden Power Off (SPO), which is not a normal power off operation performed by a request from the host but is a power off operation occurring at an unspecified time point, occurs, the memory system may perform a recovery operation of SPO after power is turned on. In the recovery operation of SPO, the memory system recovers system data, which is not reflected in the memory device, and flushes the recovered system data into the memory device.

Meanwhile, when SPO occurs again while the memory system performs the recovery operation of SPO, the memory system recovers the system data again in the next power on operation.

SUMMARY OF THE INVENTION

Embodiments of the present disclosure may provide a memory system, a memory controller, and a method of operating the memory system, capable of preventing deterioration of word lines and consumption of free memory blocks when SPO repeatedly occurs.

In an aspect, embodiments of the present disclosure may provide a memory system including a memory device including a plurality of memory blocks, and a memory controller configured to control the memory device by communicating with the memory device.

The memory controller may perform an operation of recovering system data lost due to Sudden Power Off(SPO) when an SPO recovery operation is performed.

The memory controller may flush recovered system data into the memory device after a first time point at which the operation of recovering the system data is completed and before a second time point at which a power off preparation request is received from a host.

The memory controller may flush recovered system data into the memory device according to a first time taken for the operation of recovering the system data and a second time to be taken for an operation of flushing the recovered system data into the memory device For example, the memory controller may read a page of an open memory block, which stores user data, among the plurality of memory blocks and identify whether there is system data lost due to the SPO based on a result of the reading. At this time, the memory controller may perform an operation of recovering system data corresponding to each user data having a preset unit size.

After flushing the recovered system data into the memory device, the memory controller may write, in the memory device, a flag indicating that a power off operation is completed without any error.

The memory controller may switch a state of the memory controller to a state in which a command received from the host is processed after the first time point.

The memory controller may transmit, to the host, a message including information on the state of the memory controller corresponding to the state in which the command received from the host is processed.

In another aspect, embodiments of the present disclosure may provide a memory controller including a memory interface configured to communicate with a memory device, and a processor configured to communicate with the memory device through the memory interface and execute firmware to control the memory device.

The processor may perform an operation of recovering system data lost due to Sudden Power Off (SPO) when an SPO recovery operation is performed.

The processor may flush recovered system data into the memory device after a first time point at which the operation of recovering the system data is completed and before a second time point at which a power off preparation request is received from a host.

The processor may flush recovered system data into the memory device according to a first time taken for the operation of recovering the system data and a second time to be taken for an operation of flushing the recovered system data into the memory device.

For example, the process may read a page of an open memory block, which stores user data, among the plurality of memory blocks and identify whether there is system data lost due to the SPO based on a result of reading. At this time, the processor may perform an operation of recovering system data corresponding to each user data having a preset unit size.

After flushing the recovered system data into the memory device, the processor may write, in the memory device, a flag indicating that a power off operation is completed without any error.

The processor may switch a state of the memory controller to a state in which a command received from the host is processed after recovering the system data.

The processor may transmit, to the host, a message including information on the state of the memory controller corresponding to the state in which the command received from the host is processed.

In another aspect, embodiments of the present disclosure may provide a method of operating a memory system including a memory device and a memory controller.

The method of operating the memory system may include recovering system data lost due to Sudden Power Off (SPO) when an SPO recovery operation is performed.

The step of recovering the system data may include reading a page of an open memory block that stores user data among a plurality of memory blocks and identifying whether there is system data lost due to SPO.

The step of recovering the system data may include repeatedly performing an operation for recovering system data corresponding to the user data according to each piece of the user data having a preset data unit size when the system data is recovered.

The method of operating the memory system may include a step of flushing recovered system data into the memory device after a first time point at which an operation of recovering the system data is completed and before a second time point at which a power off preparation request is received from a host.

At this time, the step of flushing the system data in the memory device may include flushing the recovered system data into the memory device according to a first time taken for the operation of recovering the system data and a second time to be taken for an operation of flushing the system data into the memory device.

The method of operating the memory system may further include a step of writing, in the memory device, a flag indicating that a power off operation is completed without any error after the recovered system data is flushed into the memory device.

The method of operating the memory system may further include a step of switching a state of the memory controller to a state in which a command received from the host is processed after the system data is recovered.

The method of operating the memory system may further include a step of transmitting, to the host, a message including information on the state of the memory controller corresponding to the state in which the command received from the host is processed.

According to embodiments of the present disclosure, even though the SPO repeatedly occurs, it is possible to prevent deterioration of word lines and consumption of free memory blocks.

BRIEF DESCRIPTION OF THE DRAWINGS

The above and other aspects, features and advantages of the present disclosure will be more apparent from the following detailed description taken in conjunction with the accompanying drawings, in which:

FIGS. 6A and 6B illustrate a comparison between an operation of a memory system according to an embodiment of the present disclosure and an operation of a conventional memory system;

DETAILED DESCRIPTION OF THE EXEMPLARY EMBODIMENTS

Hereinafter, embodiments of the present disclosure will be described in detail with reference to the accompanying drawings.

Figure 1:
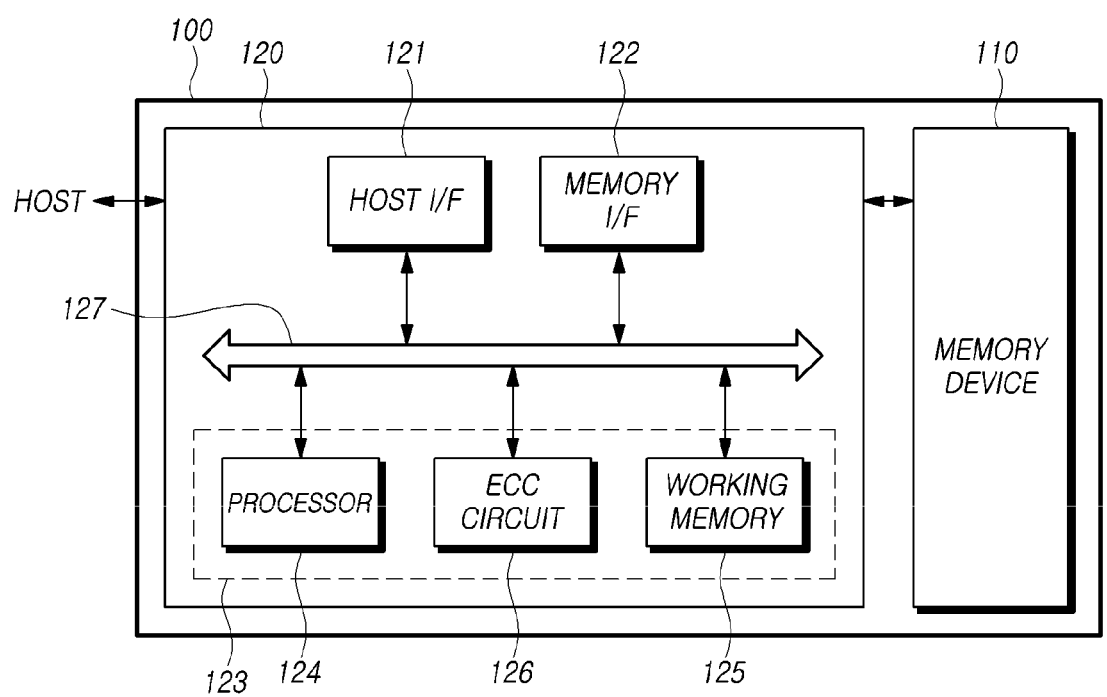
FIG. 1 is a block diagram schematically illustrating a memory system according to an embodiment of the present disclosure.

FIG. 1 illustrates a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

The memory device 110 may be implemented in a three-dimensional array structure. Embodiments of the present disclosure are applicable not only to a flash memory device having an electric charge storage layer configured as a conductive floating gate, but also to a flash memory device in which a charge trap flash (CTF) has an electric charge storage layer configured as an insulating film.

The memory device 110 may receive a command and an address from the memory controller 120 and access a memory area of the memory cell array selected by the address. That is, the memory device 110 may perform an operation corresponding to the command in the memory area of the memory device having a physical address corresponding to the address.

For example, the memory device 110 may perform a program operation, a read operation, an erasure operation, and the like. During the program operation, the memory device 110 may program data in the memory area selected by the address. During the read operation, the memory device 110 may read data from the memory area selected by the address. During the erasure operation, the memory device 110 may erase data stored in the memory area selected by the address.

The memory controller 120 may control write (program), read, erasure, and background operations with regard to the memory device 110. The background operation may include, for example, at least one among a garbage collection operation (GC), a wear leveling (WL) operation, and a bad block management (BBM) operation.

The memory controller 120 may control an operation of the memory device 110 at a request of a host. Alternatively, the memory controller 120 may control an operation of the memory device 110 without a corresponding request of the host when it performs one or more background operations of the memory device.

The memory controller 120 and the host may be separate devices. In some embodiments, the memory controller 120 and the host may be integrated in a single device. In the following description, the memory controller 120 and the host are separate devices.

Referring to FIG. 1, the memory controller 120 may include a memory interface 122, a control circuit 123, and a host interface 121.

The host interface 121 may provide an interface for communication with the host.

When receiving a command from the host, the control circuit 123 may receive the command through the host interface 121 and may perform an operation of processing the command.

The memory interface 122 may be connected to the memory device 110 to provide an interface for communication with the memory device 110. That is, the memory interface 122 may provide the memory device 110 and the memory controller 120 with an interface under the control of the control circuit 123.

The control circuit 123 may control an operation of the memory device 110 by performing operations for an overall control of the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the use of the FTL. The FTL may receive the LBA and translate the LBA into the PBA by using a mapping table.

There are various address mapping methods, which may be employed by the FTL, according to a mapping unit. Typical address mapping methods may include a page mapping method, a block mapping method, and a hybrid mapping method.

In a program operation, the processor 124 may randomize data received from the host. For example, the processor 124 may randomize data received from the host by using a randomizing seed. The randomized data is provided to the memory device 110 as data to be stored and programmed in the memory cell array.

The processor 124 may derandomize data received from the memory device 110 during a read operation. For example, the processor 124 may derandomize data received from the memory device 110 by using a derandomizing seed. The derandomized data may be output to the host.

The processor 124 may execute firmware (FW) to control an operation of the memory controller 120. In other words, the processor 124 may control the overall operation of the memory controller 120 and, in order to perform a logical operation, may execute or drive firmware loaded into the working memory 125 during booting.

The firmware refers to a program executed inside the memory system 100, and may include various functional layers.

For example, the firmware may include at least one of a flash translation layer (FTL) configured to perform a translation operation between a logical address provided by the host and a physical address of the memory device 110, a host interface layer (HIL) configured to interpret a command that the host issues to the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, and/or pieces of data necessary to drive the memory controller 120. The working memory 125 may include a volatile memory such as at least one among a static RAM (SRAM), a dynamic RAM (DRAM), a synchronous RAM (SDRAM), and the like.

The error detection/correction circuit 126 may detect an error bit of check target data by using an error correction code, and correct the detected error bit. For example, the check target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, the error detection/correction circuit 126 may include a decoder that performs nonsystematic code decoding or a decoder that performs systematic code decoding.

For example, the error detection/correction circuit 126 may detect an error bit, sector by sector, with regard to each piece of read data. That is, each piece of read data may include multiple sectors. As used herein, a sector may refer to a data unit smaller than a read unit (page) of a flash memory. Sectors constituting each piece of read data may correspond to each other using an address.

The error detection/correction circuit 126 may calculate a bit error rate (BER) and determine whether or not error correction can be performed sector by sector. For example, if the BER is higher than a reference value, the error detection/correction circuit 126 may determine that a corresponding sector is uncorrectable or failed. If the BER is lower than or equals to the reference value, the error detection/correction circuit 126 may determine that the corresponding sector is correctable or passed.

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing the error detection and correction operations with regard to all pieces, of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

A bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some cases, one or more other constituent elements may be added to the memory controller 120 in addition to the above-mentioned constituent elements of the memory controller 120.

Hereinafter, the memory device 110 will be described in more detail with reference to FIG. 2.

Figure 2:
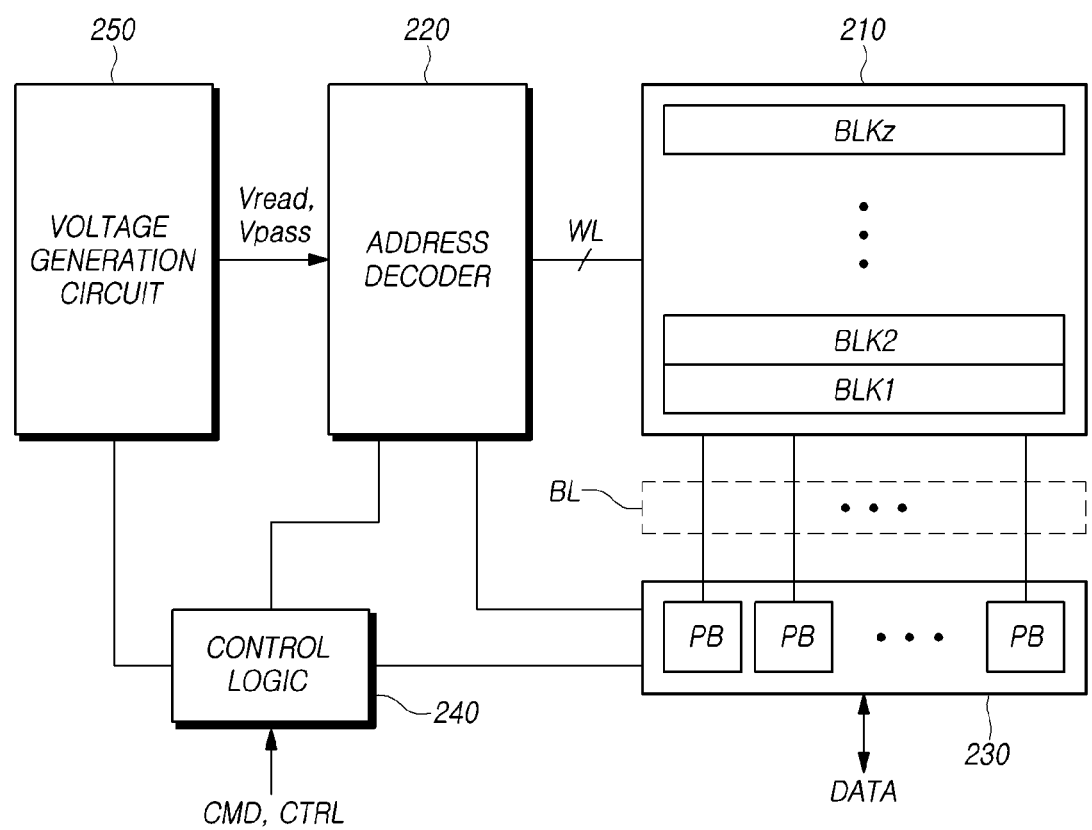
FIG. 2 is a block diagram schematically illustrating a memory device according to an embodiment of the present disclosure.

FIG. 2 is a block diagram schematically illustrating the memory device 110 of FIG. 1 according to an embodiment of the present disclosure.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number larger than 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells may be nonvolatile memory cells, and the nonvolatile memory cells may have a vertical channel structure.

The memory cell array 210 may have a two-dimensional structure or a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, each of the multiple memory cells included in the memory cell array 210 may store at least five bits of data.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may operate under the control of the control logic 240.

The address decoder 220 may receive addresses through an input/output buffer inside the memory device 110. The address decoder 220 may decode a block address among the received addresses. The address decoder 220 may select at least one memory block in the memory cell array 210 according to the decoded block address.

The address decoder 220 may receive a read voltage Vread and a pass voltage Vpass from the voltage generation circuit 250.

The address decoder 220 may apply the read voltage Vread to a selected word line WL in the selected memory block when applying the read voltage during a read operation, and may apply the pass voltage Vpass to the remaining non-selected word lines WL in the selected memory block.

The address decoder 220 may apply a verification voltage generated by the voltage generation circuit 250 to the selected word line WL in the selected memory block during a program verification operation, and may apply the pass voltage Vpass to the remaining non-selected word lines WL in the selected memory block.

The address decoder 220 may decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block according to the block address and one word line according to the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write (or program) operation.

The read/write circuit 230 may be referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB included in the read/write circuit 230 may be connected to the memory cell array 210 through the multiple bit lines BL, respectively. In order to sense a threshold voltage Vth of memory cells during a read operation and a program verification operation, the multiple page buffers PB may continuously supply a sensing current to the bit lines BL connected to the memory cells, sense, at a sensing node, a change in an amount of current that flows through a corresponding bit line according to a program state of a corresponding memory cell, and may latch the sensed value as sensing data.

The read/write circuit 230 may operate in response to page buffer control signals output from the control logic 240.

During a read operation, the read/write circuit 230 senses data in a memory cell, temporarily stores the retrieved data, and outputs the data to the input/output buffer of the memory device 110. In an embodiment, the read/write circuit 230 may include a column selection circuit in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may control the overall operation of the memory device 110 in response to the control signal CTRL. The control logic 240 may output a control signal for adjusting a pre-charge potential level of sensing nodes of the multiple page buffers PB.

The control logic 240 may control the read/write circuit 230 to perform a read operation in the memory cell array 210. The voltage generation circuit 250 may generate the read voltage Vread and the pass voltage Vpass, which are used during the read operation, in response to a voltage generation circuit control signal output from the control logic 240.

A memory block BLK included in the memory device 110 may include multiple pages PG and multiple strings. The multiple pages PG respectively correspond to the multiple word lines WL, and the multiple strings STR respectively correspond to the multiple bit lines BL.

In the memory block BLK, the multiple word lines WL and the multiple bit lines BL may be arranged to intersect with each other. For example, each of the multiple word lines WL may be arranged in a row direction, and each of the multiple bit lines BL may be arranged in a column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC disposed at respective intersections of the multiple word lines WL and the multiple bit lines BL. Each of the multiple memory cells MC may have a transistor TR arranged therein.

For example, the transistor TR arranged in each of the multiple memory cells MC may include a drain, a source, and a gate. The drain (or source) of the transistor TR may be connected to a corresponding bit line BL directly or via another transistor TR. The source (or drain) of the transistor TR may be connected to a source line (which may be the ground) directly or via another transistor TR. The gate of the transistor TR may include a floating gate (FG) surrounded by an insulator, and a control gate (CG) to which a gate voltage is applied from a corresponding word line WL.

In each of the multiple memory blocks BLK1-BLKz, a first selection line (also referred to as a source selection line or a drain selection line) may be additionally arranged outside the first outermost word line, which is closer to the read/write circuit 230, among two outermost word lines of the multiple word lines WL, and a second selection line (also referred to as a drain selection line or a source selection line) may be additionally arranged outside a second outermost word line, which is closer to the source line, among the two outermost word lines of the multiple word lines WL.

In some cases, at least one dummy word line may be additionally arranged between the first outermost word line and the first selection line. In addition, at least one dummy word line may be additionally arranged between the second outermost word line and the second selection line.

A read operation and a program operation (or write operation) of the memory block may be performed page by page, and an erasure operation may be performed memory block by memory block.

Figure 3:
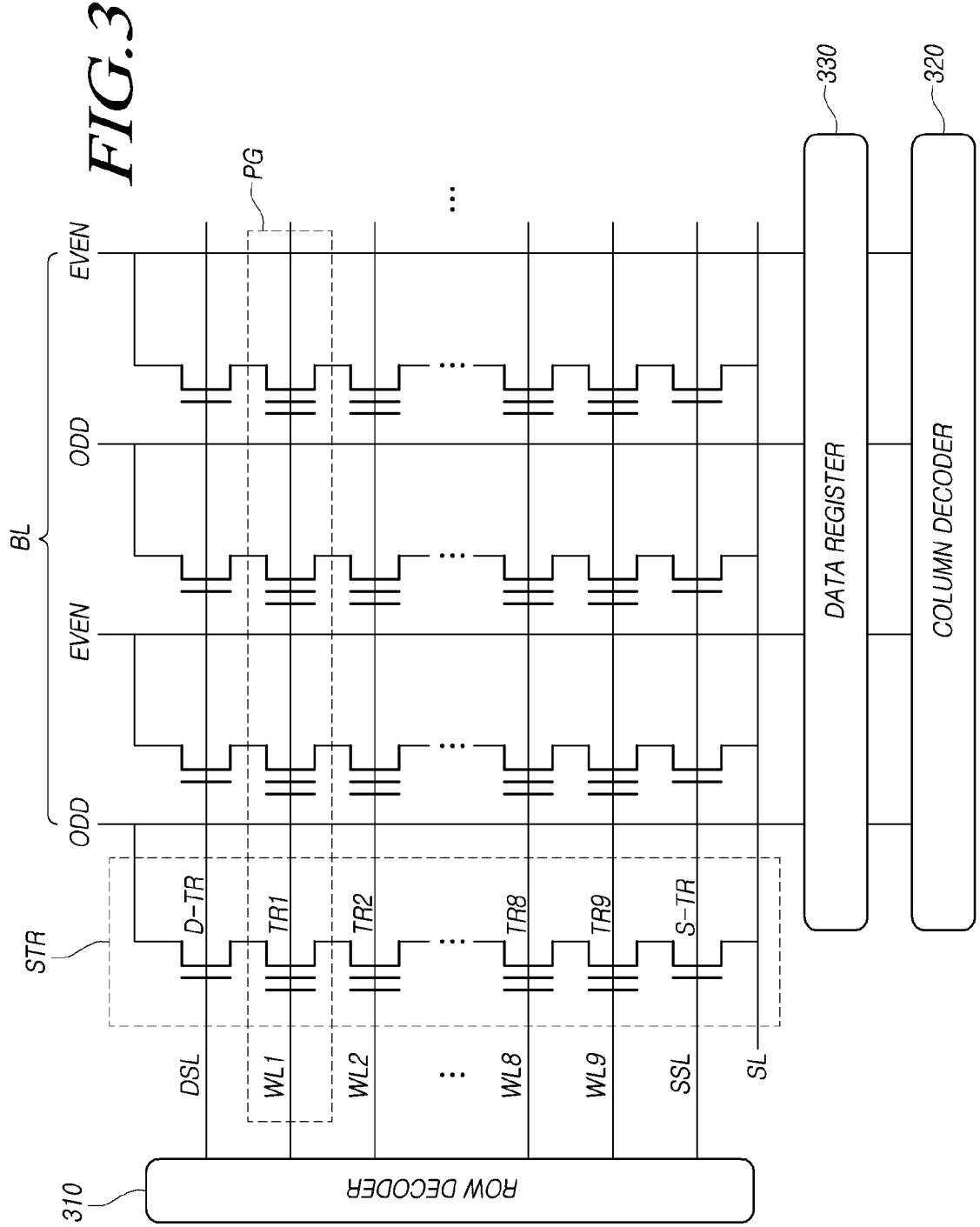
FIG. 3 is a diagram illustrating a structure of word lines and bit lines of a memory device according to an embodiment of the present disclosure.

FIG. 3 is a diagram illustrating a structure of word lines WL and bit lines BL of the memory device 110 of FIG. 1 according to an embodiment of the present disclosure.

Referring to FIG. 3, the memory device 110 has a core area in which memory cells MC are disposed, and an auxiliary area which corresponds to the remaining area other than the core area. The auxiliary area supports operations of the memory cell array 210.

The core area may include multiple pages PG and multiple strings STR. In the core area, multiple word lines WL1-WL9 and multiple bit lines BL are arranged to intersect with each other.

The word lines WL1-WL9 may be connected to a row decoder 310. The bit lines BL may be connected to a column decoder 320. A data register 330, which corresponds to the read/write circuit 230 of FIG. 2, may be disposed between the multiple bit lines BL and the column decoder 320.

The multiple word lines WL1-WL9 may correspond to the multiple pages PG, respectively.

For example, each of the multiple word lines WL1-WL9 may correspond to one page PG as illustrated in FIG. 3. When each of the multiple word lines WL1-WL9 is significantly long, each of the multiple word lines WL1-WL9 may be divided into at least two sub- word lines and thus correspond to at least two (for example, two or four) pages PG respectively corresponding to the at least two sub-word lines. Each page PG is the smallest unit in connection with conducting a program operation and a read operation, and all memory cells MC within the same page PG may perform a corresponding operation when conducting a program operation or a read operation.

The multiple bit lines BL may be connected to the column decoder 320 and include odd-numbered bit lines BL and even-numbered bit lines BL.

For accessing a target memory cell MC, an address may be entered to the core area first through the input/output buffer and then through the row decoder 310 and the column decoder 320 such that the target memory cell MC can be designated. As used herein, designating the target memory cell MC refers to accessing one of the memory cells MC at the intersections of the word lines WL1-WL9 connected to the row decoder 310 and the bit lines BL connected to the column decoder 320.

Pages PG in a first direction (for example, X-axis direction) are bound by a common line that is a word line WL, and strings STR in a second direction (for example, Y-axis direction) are bound (or connected) by a common line that is a bit line BL. As used herein, commonly binding refers to structurally connecting using the same material so that the commonly bound components simultaneously receive the same voltage during voltage application. A voltage applied to a memory cell MC disposed in a middle position among memory cells MC connected in series may have a slightly different voltage level from a voltage applied to a memory cell MC disposed in the first position and from a voltage applied to a memory cell MC disposed in the last position, due to a voltage drop across a preceding memory cell MC, the memory cell MC disposed in the first position being closer to the voltage generation circuit 250 than the memory cell MC disposed in the middle position, and the memory cell MC disposed in the middle position being closer to the voltage generation circuit 250 than the memory cell MC disposed in the last position.

The data register 330 plays an essential role because all data processing by the memory device 110, including program and read operations, occurs via the data register 330. If data processing by the data register 330 is delayed, all of the other circuits need to wait until the data register 330 finishes the data processing. Therefore, the delay in the data register 330 may degrade the overall performance of the memory device 110.

Referring to FIG. 3, in one string STR, multiple transistors TR1-TR9 may be connected to multiple word lines WL1-WL9, respectively. The multiple transistors TR1-TR9 correspond to multiple memory cells MC. In this example, each of the multiple transistors TR1-TR9 includes a control gate CG and a floating gate FG.

The multiple word lines WL1-WL9 include two outermost word lines WL1 and WL9. A first selection line DSL may be additionally arranged outside the first outermost word line WL1, which is closer to the data register 330 in terms of a signal path among the two outermost word lines WL1 and WL9. A second selection line SSL may be additionally arranged outside the second outermost word line WL9.

A first selection transistor D-TR, which is turned on/off in response to a voltage of the first selection line DSL, has a gate electrode connected to the first selection line DSL, but includes no floating gate FG. A second selection transistor S-TR, which is turned on/off in response to a voltage of the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

During a program operation, the memory system 100 programs the target memory cell MC by connecting the target memory cell MC to the bit line BL so that the target memory cell MC is filled with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a program verification operation. Accordingly, during the read operation or the program verification operation, a current may flow through the corresponding string STR and drain to the source line SL, which corresponds to the ground, such that a voltage level of the bit line BL can be measured or sensed. However, during the read operation, there may be a time difference in the on/off timing between the first selection transistor D-TR and the second selection transistor S-TR.

The memory system 100 may supply a predetermined voltage (for example, +20V) to a substrate through the source line SL during an erasure operation. The memory system 100 floats both the first selection transistor D-TR and the second selection transistor S-TR during the erasure operation, thereby generating an infinite resistance. As a result, a switching role of the first selection transistor D-TR and that of the second selection transistor S-TR may be removed during the erasure operation, and electrons may operate only between a floating gate FG and the substrate due to a potential difference.

Figure 4:
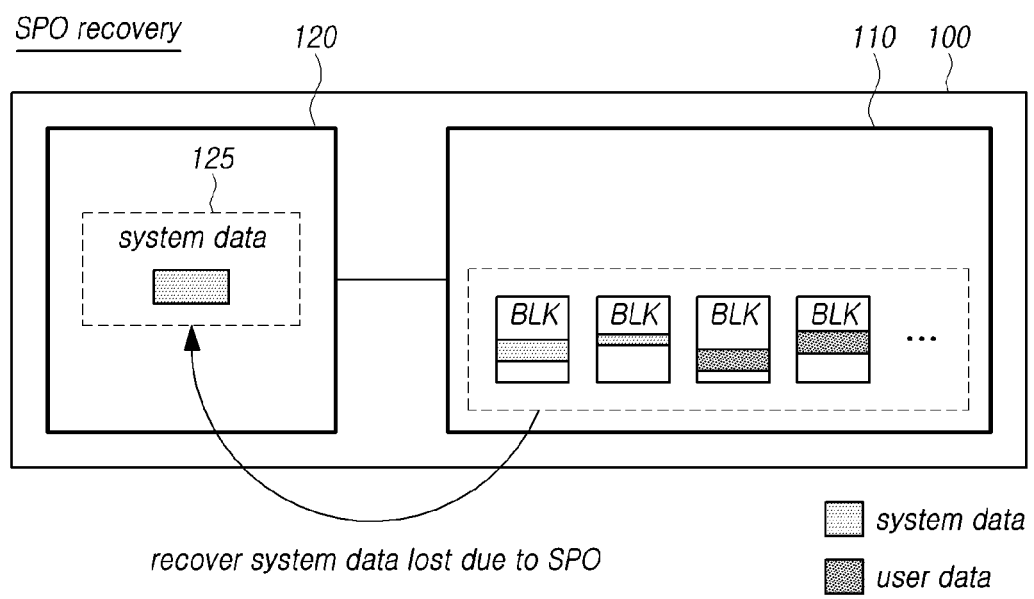
FIG. 4 illustrates an SPO recovery operation of a memory system according to an embodiment of the present disclosure.

FIG. 4 illustrates an SPO recovery operation of the memory system 100 of FIG. 1 according to an embodiment of the present disclosure.

Referring to FIG. 4, in the SPO recovery operation, the memory controller 120 of the memory system 100 may identify system data and user data stored in a memory block (BLK) of the memory device 110 in order to recover lost system data, which is failed to be stored in the memory device 110, when SPO occurs.

The system data may be data used to manage the user data that is processed by firmware driven by the memory controller 120 of the memory system 100, and may be referred to as metadata, management data, or the like.

The system data may include the following information.

For example, the system data may include mapping information indicating a relationship between a logical address and a physical address, the logical address being provided by the host, the physical address corresponding to an address of a memory region in the memory device 110 where the user data is stored.

In another example, the system data may include information indicating an open memory block among a plurality of memory blocks included in the memory device 110. Further, the system data may include a write pointer indicating a physical address in which data is written in each open memory block.

In another example, the system data may include erase/write cycle information or read count information on each of the plurality of memory blocks included in the memory device 110.

In another example, the system data may include management information on the plurality of memory blocks included in the memory device 110. The management information may include information on a memory block, which stores the mapping information, information on a memory block, which stores history logging information related to an operation of the memory system 100, information on an open memory block, and information on a closed memory block, among the plurality of memory blocks included in the memory device 110.

The memory controller 120 may recover the lost system data based on the system data and the user data stored in the memory block (BLK) of the memory device 110.

The system data may be flushed into the memory device 110 after being first stored in the working memory 125 within the memory controller 120. When the SPO occurs while the system data is stored in the working memory 125, the system data stored in the working memory 125 is lost without being stored in the memory device 110. Accordingly, the memory controller 120 is required to recover the lost system data due to the SPO by performing the SPO recovery operation.

Figure 5:
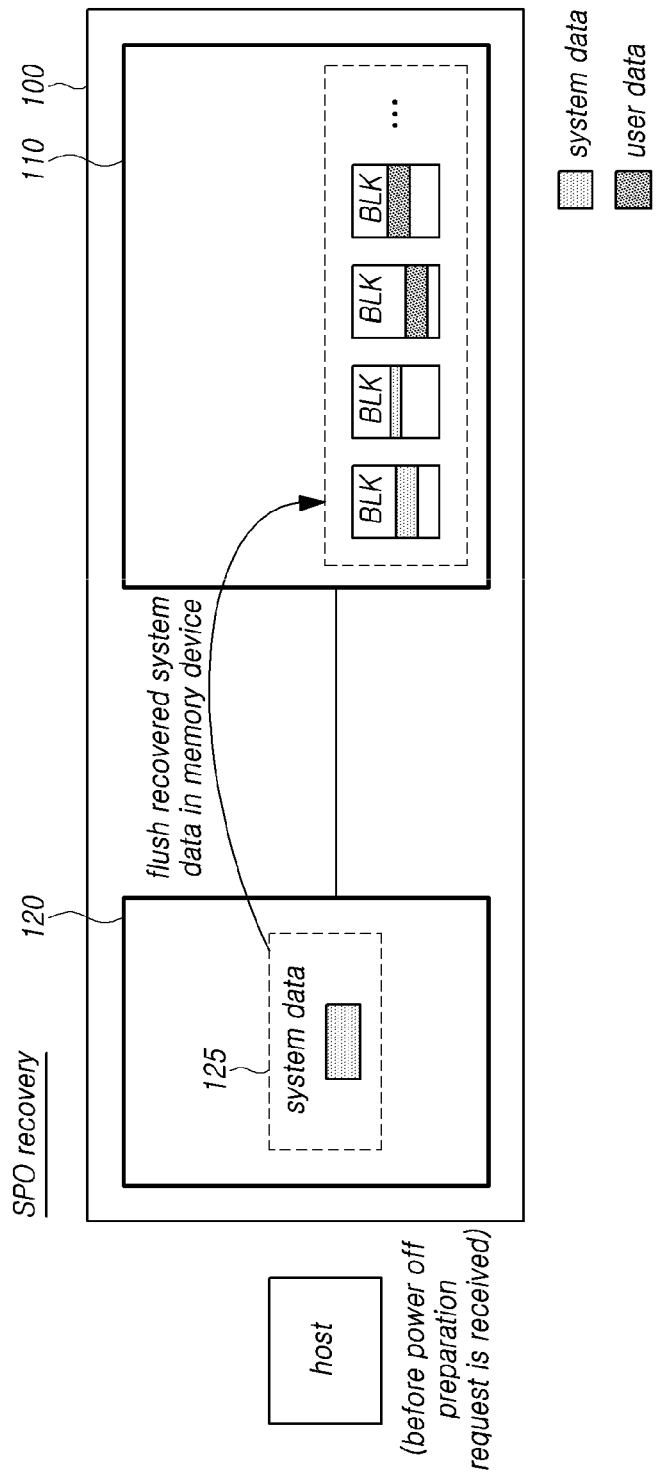
FIG. 5 illustrates an operation in which a memory controller flushes system data into a memory device according to an embodiment of the present disclosure.

FIG. 5 illustrates an operation in which the memory controller 120 of FIG. 1 flushes system data into the memory device 110 according to an embodiment of the present disclosure.

Referring to FIG. 5, the memory controller 120 of the memory system 100 may flush recovered system data stored in the working memory 125 into the memory device 110 between a first time point at which an operation of recovering system data lost due to the SPO is completed and a second time point at which a power off preparation request is received from the host.

The power off preparation request may be a request for instructing an operation configured to prepare for a power off operation of the memory system 100, and the memory system 100 may flush system data stored in the working memory 125 into the memory device 110 in response to the power off preparation request. In the prior art, for example, the memory system 100 may flush system data stored in the working memory 125 into the memory device 100 when the power off preparation request is received from the host after the SPO recovery operation is completed. Further, in another example, the memory system 100 may receive the power off preparation request from the host while another request received from the host is processed after the SPO recovery operation is completed, and may flush system data stored in the working memory 125 into the memory device 100 when the power off preparation request is received from the host.

However, according to the embodiment of the present disclosure, the memory controller 120 may flush the recovered system data into the memory device 110 before the power off preparation request is received from the host.

Meanwhile, the memory controller 210 may flush the recovered system data into the memory device 110 based on 1) a first time taken for performing the operation of recovering the lost system data and 2) a second time to be taken to flush the recovered system data into the memory device 110, before the power off preparation request is received from the host.

For example, when a sum of the first time and the second time is shorter than a preset threshold time, the memory controller 120 may flush the recovered system data into the memory device 110.

On the other hand, when the sum of the first time and the second time is longer than or equal to the preset threshold time, the memory controller 120 may not flush the recovered system data into the memory device 110. This is to prevent deterioration of the performance of the memory system 100 generated due to an increase in a time taken for recovering the lost system data and flushing the recovered system data.

Hereinafter, advantages of the case in which the memory controller 120 flushes the recovered system data into the memory device 110 before the power off preparation request is received from the host will be described in comparison with the conventional memory system in which the memory controller 120 flushes the recovered system data into the memory device 110 in response to the power off preparation request from the host.

Figure 6A:
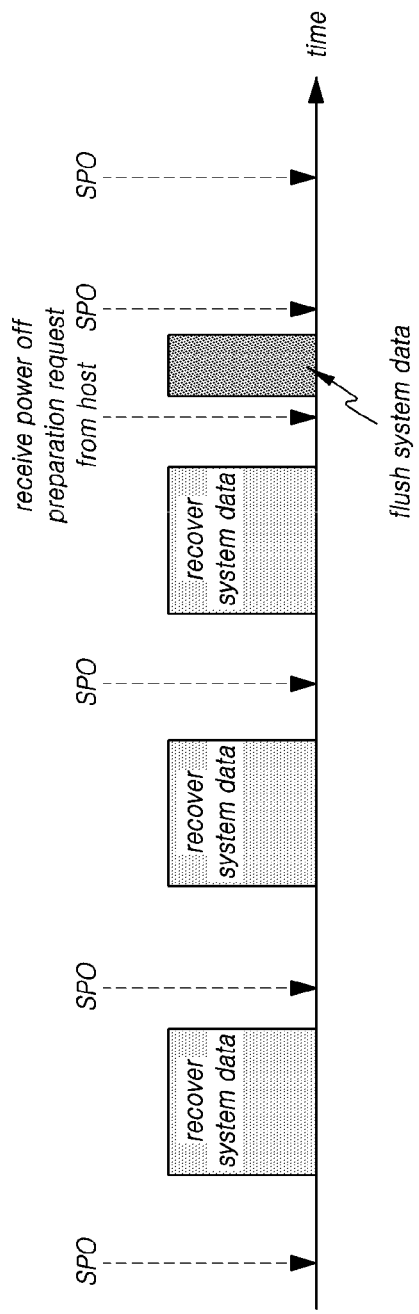

FIGS. 6A and 6B respectively illustrate an operation of the conventional memory system and an operation of the memory system 100 of FIG. 1 according to an embodiment of the present disclosure.

Referring to FIG. 6A, when the SPO occurs again before the power off preparation request is received from a host after the SPO recovery operation is performed, the conventional memory system repeatedly performs the SPO recovery operation whenever the SPO occurs and power is back.

In this case, when the SPO occurs repeatedly before the power off preparation request is received from the host, the conventional memory system repeatedly performs the SPO recovery operation after each SPO occurs.

As described above, when the SPO recovery operation is repeatedly performed, the conventional memory system repeatedly performs an operation of reading system data or user data stored in a memory device and changing a physical location of the corresponding system data or user data as necessary.

At this time, when the operation of reading the system data or the user data stored in the memory device is repeated, read stress applied to a word line coupled to a memory region in which the corresponding system data or user data is stored increases and thus deterioration may occur in the word line.

Further, dummy data is written in a memory region coupled to a given word line so as not to use the given word line for which it is not possible to identify whether erasure is performed thereon during the SPO recovery operation, and thus the number of free memory blocks among a plurality of memory blocks included in the memory device may be reduced. In this case, a garbage collection operation for securing a free memory block may be more frequently performed and thus the performance of the memory system may decrease.

In addition, a read count value of a specific memory block among the plurality of memory blocks included in the memory device may increase and thus a time point for performing a read reclaim operation may come earlier.

On the other hand, referring to FIG. 6B, the memory system 100 according to the embodiment of the present disclosure may perform an operation for flushing system data into the memory device 110 after a first time point at which an operation for recovering the system data is completed even before the power off preparation request is received from the host.

Accordingly, even though the SPO occurs before a second time point at which the power off preparation request is received from the host after the system data is flushed into the memory device 110, the operation for recovering the system data is not performed again when power is back after the SPO.

Accordingly, when the SPO occurs repeatedly, the memory system 100 may prevent a problem of unnecessarily repeating the system data recovery operation. That is, it is possible to avoid deterioration of a word line, a decrease in the number of free memory blocks, and advance of a time point of a read reclaim operation.

Figure 7:
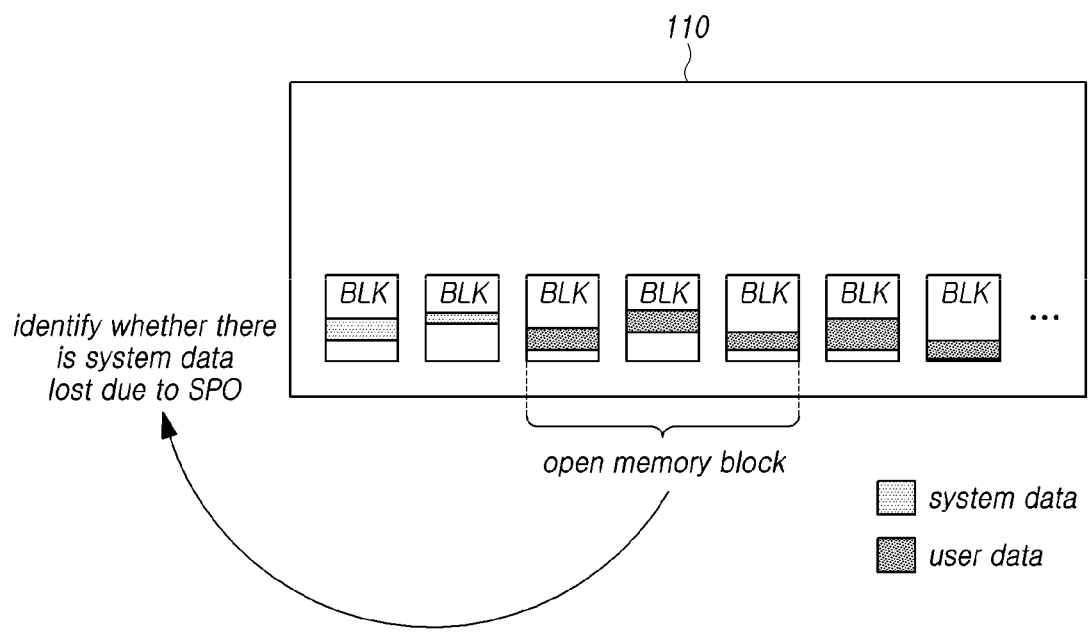
FIG. 7 illustrates open memory blocks in a memory device according to an embodiment of the present disclosure.

FIG. 7 illustrates open memory blocks in the memory device 110 of FIG. 1 according to an embodiment of the present disclosure.

Referring to FIG. 7, the memory controller 120 of the memory system 100 may identify whether there is lost system data due to SPO by reading user data stored in an open memory block among memory blocks (BLK) included in the memory device 110 and, when it is identified that there is the lost system data, recover the lost system data.

User data written in the memory device 110 when the SPO occurs is written in an open memory block. Accordingly, the memory controller 120 may scan only the user data written in the open memory block and identify whether system data corresponding to the user data written in the open memory block is stored in the memory device 110 so as to identify whether there is lost system data when the SPO occurs.

The memory controller 120 may read user data stored in all pages included in the open memory block one by one and identify whether system data corresponding to the user data is stored in the memory device 110 according to whether a value of system data corresponding to each page among the system data stored in the memory device 110 has a specific pattern (e.g., 0xFFFFFFFF).

When the system data corresponding to the user data written in the open memory block is not stored in the memory device 110, the memory controller 120 may determine that the system data corresponding to the user data is lost when the SPO occurs.

Figure 8:
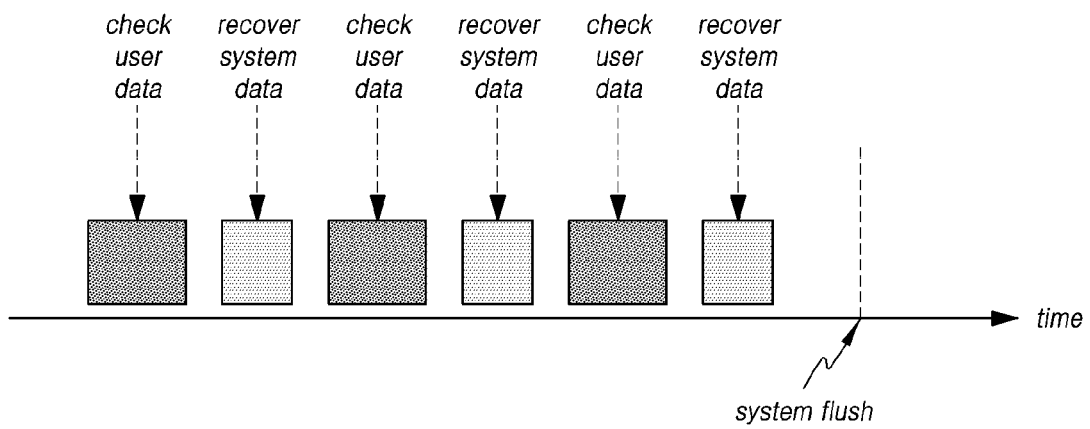
FIG. 8 is a conceptual diagram illustrating an operation in which a memory controller recovers system data according to an embodiment of the present disclosure.

FIG. 8 is a conceptual diagram illustrating an operation in which the memory controller 120 of FIG. 1 recovers system data according to an embodiment of the present disclosure.

Referring to FIG. 8, when recovering system data lost due to the SPO, the memory controller 120 of the memory system 100 may repeatedly perform the operation for recovering system data for each user data having a preset unit size (e.g., 4 KB). At this time, the unit size may be a multiple of a page size, the page size being a unit size of which data is read or written in the memory device 110.

Specifically, when it is assumed that the unit size for recovering the system data is 4 KB, the memory controller 120 may check user data having the unit size of 4 KB, recover system data for the checked user data, and store the recovered system data in the working memory 125 within the memory controller 120.

The memory controller 120 may check another user data having the unit size of 4 KB, recover system data for the checked user data, and store the recovered system data in the working memory 125 within the memory controller 120.

After repeatedly performing the recovery operation, the memory controller 120 may flush all of the recovered system data into the memory device 110 when a specific condition is satisfied. For example, when the size of the user data corresponding to the recovered system data is larger than or equal to a preset threshold data size (e.g., 1 MB), the memory controller 120 may flush the recovered system data into the memory device 110.

Figure 9:
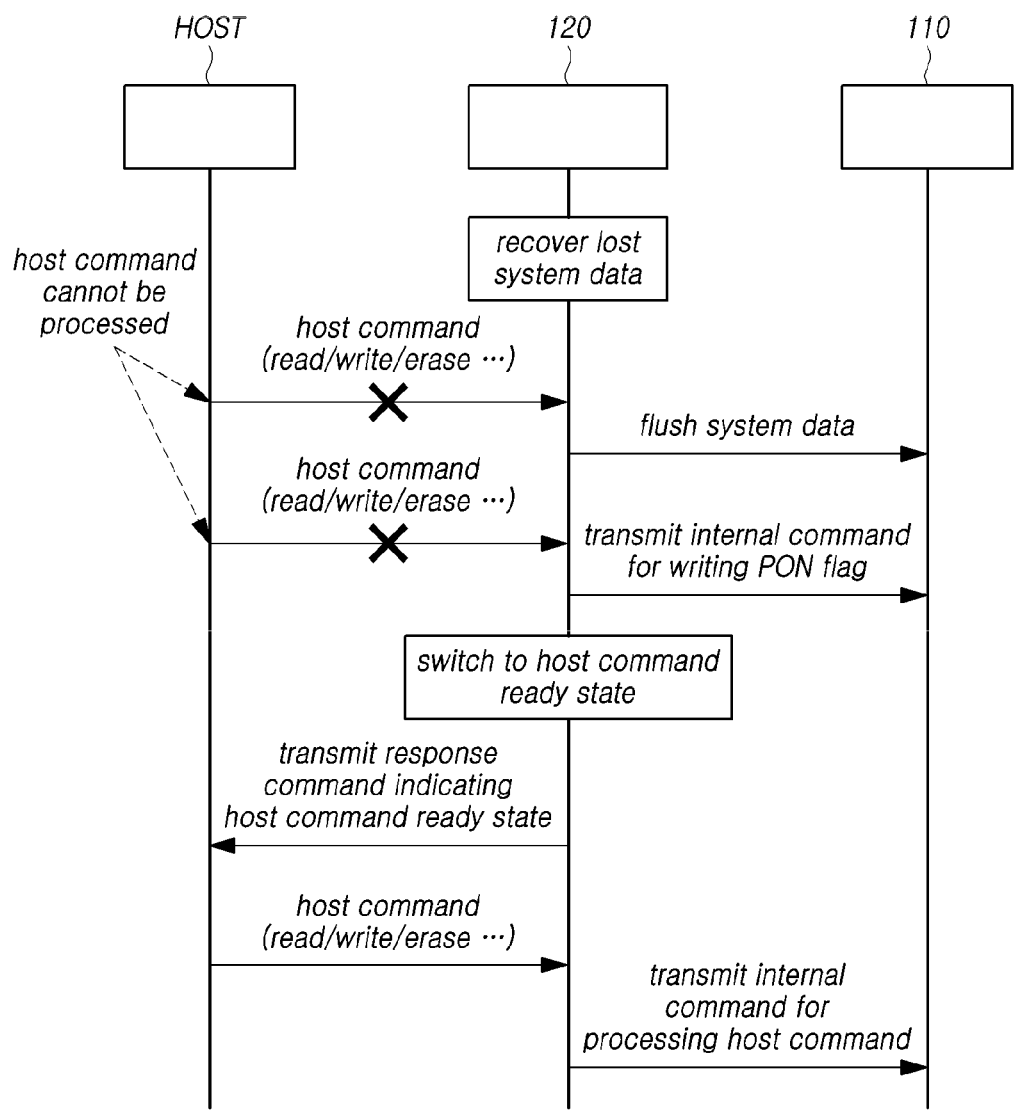
FIG. 9 is a flowchart illustrating an operation in which a memory system processes a host command according to an embodiment of the present disclosure.

FIG. 9 is a flowchart illustrating an operation in which the memory system 100 of FIG. 1 processes a host command received from the host according to an embodiment of the present disclosure.

Referring to FIG. 9, when an SPO recovery operation is performed after SPO occurs, the memory controller 120 of the memory system 100 may perform an operation for recovering system data lost due to the SPO.

When the operation for recovering the system data lost due to the SPO is completed, the memory controller 120 may flush the recovered system data into the memory device 110 of the memory system 100.

After flushing the recovered system data into the memory device 110, the memory controller 120 may write a Power Off Normal (PON) flag indicating that an power off operation is normally completed without any error, in the memory device 110. At this time, the memory controller 120 may transmit an internal command for writing the PON flag to the memory device 110, the internal command being a command used within the memory system 100.

The PON flag may be used to determine whether to perform the SPO recovery operation when the memory controller 120 performs the next power on operation. When the PON flag is not written in the memory device 110, the memory controller 120 may perform the SPO recovery operation. However, when the PON flag is written in the memory device 110, the memory controller 120 may load system data stored in the memory device 110 without any change.

When the memory controller 120 is performing the operation for recovering the system data, a host command received from the host, e.g., a read/write/erase command, cannot be processed.

After completing the operation for recovering the system data, the memory controller 120 may switch a state of the memory controller 120 to a host command ready state. The host command ready state is a state in which the memory controller 120 is able to process the host command received from the host.

After switching the state of the memory controller 120 to the host command ready state, the memory controller 120 may transmit a response command indicating that the state of the memory controller 120 has been switched to the host command ready state to the host. The response command is a command used by the memory controller 120 to transmit a response to a host command to the host.

After receiving the response command indicating that the state of the memory controller 120 has been switched to the host command ready state, the host may transmit a host command to the memory controller 120 again. Thereafter, the memory controller 120 may transmit an internal command for processing the host command received from the host to the memory device 110.

Figure 10:
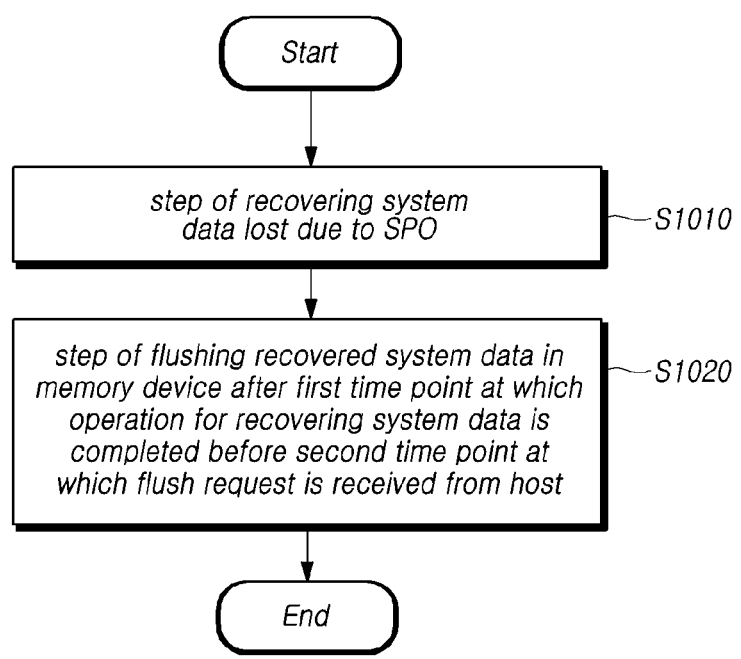
FIG. 10 illustrates a method of operating a memory system according to an embodiment of the present disclosure.

FIG. 10 illustrates a method of operating the memory system 100 of FIG. 1 according to an embodiment of the present disclosure.

Referring to FIG. 10, at S1010, the memory controller 120 may perform an operation for recovering system data lost due to SPO.

In the recovery operation, the memory controller 120 may read a page of an open memory block that stores user data among a plurality of memory blocks in the memory device 110 and identify whether there is the system data lost due to the SPO.

The operation for recovering system data is repeatedly performed for each user data having a preset unit size.

At S1020, the memory controller 120 may flush the recovered system data into the memory device 110 between a first time point at which the operation for recovering the system data is completed and a second time point at which a power off preparation request is received from the host.

Meanwhile, the recovered system data may be flushed into the memory device 110 based on a first time taken for the operation for recovering the system data and a second time to be taken for the operation for flushing the system data into the memory device 110.

In addition to S1010 and S1020, the method of operating the memory system 100 may further include writing a flag indicating that a power off operation is normally performed in the memory device 110 after flushing the system data into the memory device 110.

The method of operating the memory system 100 may further include switching a state of the memory controller 120 to a state in which a host command received from the host can be processed after a first time point at which the system data is recovered.

The method of operating the memory system 100 may further include transmitting, to the host, a response command including information on the state of the memory controller 120 in which the host command received from the host can be processed.

Meanwhile, the operation of the memory controller 120 may be performed using the control circuit 123, and the processor 124 may execute or drive firmware to perform the operation of the memory controller 120.

Figure 11:
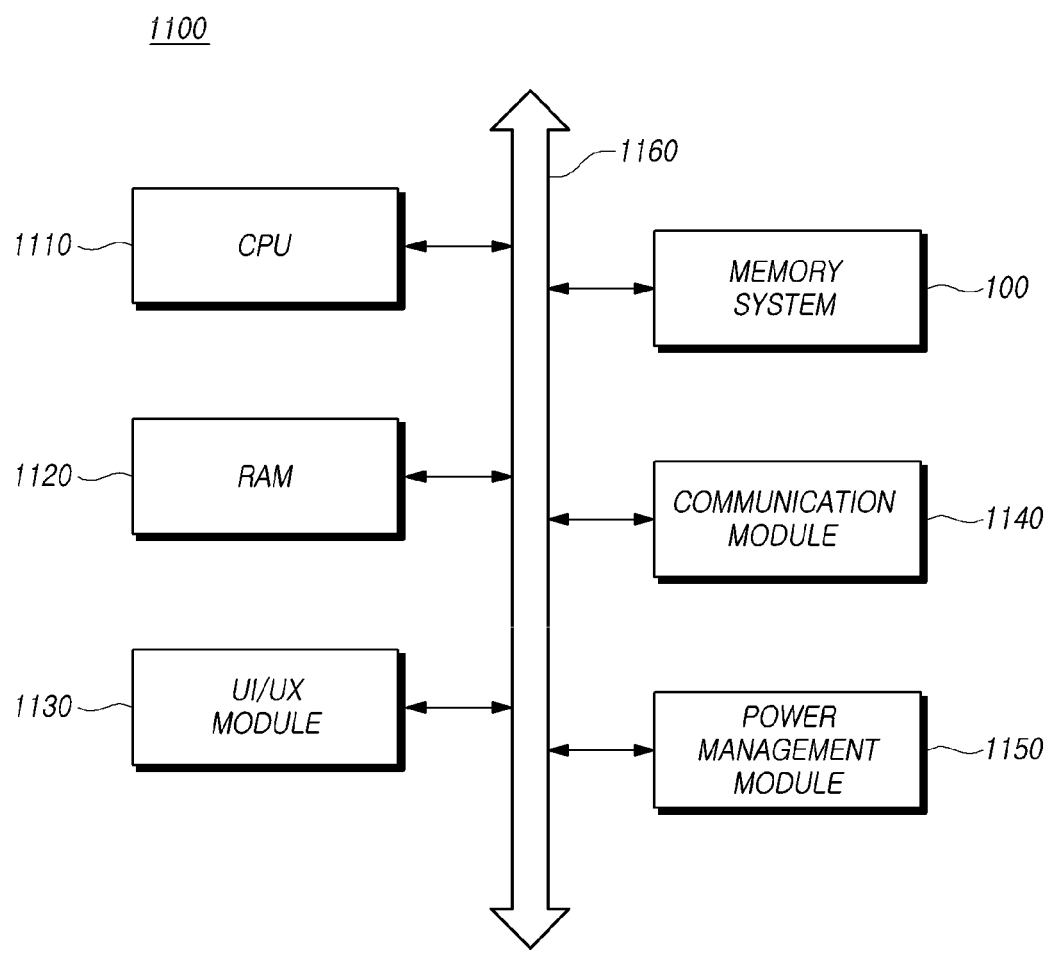
FIG. 11 is a diagram illustrating a computing system according to an embodiment of the present disclosure.

FIG. 11 is a diagram illustrating a computing system 1100 according to an embodiment of the present disclosure.

Referring to FIG. 11, the computing system 1100 may include a memory system 100 electrically connected to a system bus 1160, a CPU 1110 configured to control the overall operation of the computing system 1100, a RAM 1120 configured to store data and information related to operations of the computing system 1100, a user interface/user experience (UI/UX) module 1130 configured to provide a user with a user environment, a communication module 1140 configured to communicate with an external device using a wired and/or wireless method, and a power management module 1150 configured to manage power used by the computing system 1100.

The computing system 1100 may be a personal computer (PC), a mobile terminal such as a smartphone, a tablet, or any of various electronic devices.

The computing system 1100 may further include a battery for supplying an operating voltage, and may further include one or more of an application chipset, a graphic-related module, a camera image processor, a DRAM, and so on.

The memory system 100 may include not only a device configured to store data in a magnetic disk such as a hard disk drive (HDD), but also a device configured to store data in a nonvolatile memory such as a solid state drive (SSD), a universal flash storage device, an embedded MMC (eMMC) device, or the like. The non-volatile memory may include one or more of a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of storage devices of various types and mounted inside any of various electronic devices. The memory system 100 may correspond to the memory system 100 of FIG. 1.

According to the embodiments of the present disclosure described above, an operation delay time of the memory system may be minimized. In addition, according to the embodiments of the present disclosure, an overhead occurring in a process of calling a specific function may be minimized.

Although various embodiments of the present disclosure have been described for illustrative purposes, those skilled in the art will appreciate that various modifications, additions, and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system, comprising:
  a memory device comprising a plurality of memory blocks; and
  a memory controller configured to communicate with the memory device and control the memory device,
  wherein the memory controller performs an operation of recovering system data lost due to Sudden Power Off (SPO) when an SPO recovery operation is performed, the system data being used to manage user data, and flushes recovered system data into the memory device after a first time point at which the operation of recovering the system data is completed and before a second time point at which a power off preparation request for instructing an operation configured to prepare for a power off operation is received from a host, and
  wherein the memory controller flushes the recovered system data into the memory device according to a combination of a first time period taken for the operation of recovering the system data and a second time period to be taken for an operation of flushing the recovered system data into the memory device.

2. The memory system of claim 1, wherein the memory controller reads a page of an open memory block, which stores user data, among the plurality of memory blocks and identifies whether there is system data lost due to the SPO based on a result of the reading.

3. The memory system of claim 2, wherein the memory controller performs an operation of recovering system data corresponding to each user data having a preset unit size.

4. The memory system of claim 1, wherein, after flushing the recovered system data into the memory device, the memory controller writes, in the memory device, a flag indicating that the power off operation is completed without any error.

5. The memory system of claim 1, wherein the memory controller switches a state of the memory controller to a state in which a host command received from the host is processed after the first time point; and
  wherein the memory controller transmits, to the host, a response command including information on the state of the memory controller corresponding to the state in which the host command received from the host is processed.

6. The memory system of claim 1, wherein the memory controller flushes the recovered system data into the memory device according to a sum of the first time period and the second time period.

7. The memory system of claim 6, wherein the memory controller flushes the recovered system data into the memory device according to a comparison result of the sum of the first time period and the second time period with a preset time period.

8. A memory controller, comprising:
  a memory interface configured to communicate with a memory device comprising a plurality of memory blocks; and
  a processor configured to communicate with the memory device through the memory interface and execute firmware to control the memory device,
  wherein the processor performs an operation of recovering system data lost due to Sudden Power Off (SPO) when an SPO recovery operation is performed, the system data being used to manage user data, and flushes recovered system data into the memory device after a first time point at which the operation of recovering the system data is completed and before a second time point at which a power off preparation request for instructing an operation configured to prepare for a power off operation is received from a host, and
  wherein the processor flushes the recovered system data into the memory device according to a combination of a first time period taken for the operation of recovering the system data and a second time period to be taken for an operation of flushing the recovered system data into the memory device.

9. The memory controller of claim 8, wherein the processor reads a page of an open memory block, which stores user data, among the plurality of memory blocks and identifies whether there is system data lost due to the SPO based on a result of the reading.

10. The memory controller of claim 9, wherein the processor performs an operation of recovering system data corresponding to each user data having a preset unit size.

11. The memory controller of claim 8, wherein, after flushing the recovered system data into the memory device, the processor writes, in the memory device, a flag indicating that the power off operation is completed without any error.

12. The memory controller of claim 8, wherein the processor switches a state of the memory controller to a state in which a host command received from the host is processed after the first time point.

13. The memory controller of claim 12, wherein the processor transmits, to the host, a response command including information on the state of the memory controller corresponding to the state in which the host command received from the host is processed.

14. A method of operating a memory system that comprises a memory device and a memory controller, the method comprising:
    recovering system data lost due to Sudden Power Off (SPO) when an SPO recovery operation is performed, the system data being used to manage user data; and
    flushing recovered system data into the memory device after a first time point at which an operation of recovering the system data is completed and before a second time point at which a power off preparation request for instructing an operation configured to prepare for a power off operation is received from a host, and
    wherein flushing the recovered system data into the memory device comprises flushing the recovered system data into the memory device according to a combination of a first time period taken for the operation of recovering the system data and a second time period to be taken for an operation of flushing the recovered system data into the memory device.

15. The method of claim 14, wherein recovering the system data comprises:
    reading a page of an open memory block, which stores user data, among a plurality of memory blocks in the memory device; and
    identifying whether there is system data lost due to the SPO based on a result of the reading.

16. The method of claim 15, wherein recovering the system data comprises performing an operation of recovering system data corresponding to each user data having a preset unit size.

17. The method of claim 14, further comprising writing, in the memory device, a flag indicating that the power off operation is completed without any error after the recovered system data is flushed into the memory device.

18. The method of claim 14, further comprising switching a state of the memory controller to a state in which a host command received from the host is processed after the first time point.

19. The method of claim 18, further comprising transmitting, to the host, a response command including information on the state of the memory controller corresponding to the state in which the host command received from the host is processed.

* * * * *